United States Patent [19]

Nowick

[11] 3,970,160

[45] July 20, 1976

[54] CONTROL MEANS FOR ELECTRICALLY POWERED TRANSPORTATION MEANS

[76] Inventor: William Nowick, 1-B Plateau Place, Greenbelt, Md. 20770

[22] Filed: Nov. 6, 1973

[21] Appl. No.: 413,377

[52] U.S. Cl. ............................ 180/6.5; 180/65 A; 318/67; 318/85; 318/171; 320/59
[51] Int. Cl.² ........................................ B62D 11/04
[58] Field of Search ............ 180/6.5, 65 A; 318/52, 318/67, 71, 139, 171, 341, 85; 320/59

[56] References Cited
UNITED STATES PATENTS

| | | | |
|---|---|---|---|
| 2,565,293 | 8/1951 | Aydelott et al. | 180/6.5 |
| 3,584,276 | 6/1971 | Ringland | 318/171 |

*Primary Examiner*—M. H. Wood, Jr.
*Assistant Examiner*—John A. Pekar
*Attorney, Agent, or Firm*—Mason, Mason & Albright

[57] ABSTRACT

A steering control for an electrically powered vehicle having a pair of traction wheels on each side of the vehicle's frame, each of said wheels being driven by a synchronous type motor. The rotor field producing coils of each motor being separately controlled by the accelerator control of the vehicle and a frequency changing circuit which selectively changes the rotational speed of individual motors. The frequency changing circuit includes frequency divider switches and frequency counters connected to the rotor field producing coils; the wipers of said frequency divider switches are connected to the steering control in such manner as the output of each frequency dividing counter is varied independently. A battery included in such vehicle for producing electric power needed for the motors can be charged by a generator or alternator. Current from the battery to each motor is pulsed, and energy charging the battery from the generator or alternator is also pulsed, the latter pulses being interposed in time between the pulses from the battery to the motors. Steering sensitivity may be changed with an increase in speed by linkage between the accelerator and the frequency divider switches, so that as the speed of the vehicle increases, its turning radius is also changed in response to a given arc of turn of the control steering.

14 Claims, 6 Drawing Figures

MOTOR DRIVE TIMING
FROM T.S.C. 240
(TERMINAL 268)    (a)

BATTERY CHARGE
TIMING FOR E.E.S. 402
(TERMINAL 415)    (b)

CONTROL MEANS FOR ELECTRICALLY POWERED TRANSPORTATION MEANS

BACKGROUND OF THE INVENTION

This invention relates to an electric motor control system technique particularly for controlling the speed and the steering of the vehicle, and a compatible battery charging method for electrically powered mobile vehicles.

Electric powered vehicles of various types have been known for years and chronologically may predate the internal-combustion engine. Electric vehicles for general use have been criticized because of their comparative limited range of travel before the power source must be rejuvenated. Internal-combustion engines are presently in disfavor due to pollution problems, and solutions which seem most likely of adoption require adding more hardware to an already overly complex power plant. In projecting continued use of internal-combustion engines into the future, analysts calculate that an engine will require a minimum of 375 horsepower under the hood in order to be usable on the envisioned automated highways of tomorrow, and that all special controls will comprise units that are added to the basic requirements. Thus, the outlook on this basis suggests that with internal-combustion engines, private vehicles of the future will take a form of relatively large complicated machines having high energy consumption.

Present approaches which promote the use of electric power sources merely modify an existing vehicle to accommodate electric components and have suggested very little towards improving the longevity of the electric power source. It has occurred to the inventor that electric vehicles should be developed from scratch which accommodate an acceptable electric drive system as the basic premise, and not be the results of aborting existing design. Also, important consideration must be given to the power source.

With these thoughts in mind, the inventor is disclosing herein a new electro-mechanical control system technique and a new battery-charging technique for electric power driven vehicles. These techniques take into consideration the proposed electronic approaches for the automated highways of the future so that eventual campatibility can be achieved at a minimum of add-on design requirements.

SUMMARY OF INVENTION

The electric drive technique of my invention introduces a basic electric vehicle "building block" element defined as a "synchronized differential pair." The battery-charging technique introduces a time-shared approach compatible with the synchronized-pair concept.

This invention offers a trade-off for the massive power plant of increasing complexity under the hood and the elaborate transmission distribution machinery. The trade-off involves a small electric motor coupled to each traction drive wheel, plus an electric control system about the size of two conventional automotive voltage-regulator units. The components for the battery-charging technique occupy a volume about the size of one conventional automotive voltage-regulator unit.

The type of motor which forms part of this invention is required to have speed characteristics such that the time period per revolution of the output shaft remains constant as long as the applied motor input frequency or pulse repetition frequency remains constant; regardless of load or voltage, within the ratings of the particular motor. Also, the output shaft average speed must vary with changes in applied motor input frequency or pulse repetition frequency, within the operating range ratings of the particular motor. Thus, the output shaft average speed remains synchronized or locked-in to the applied input frequency or pulse repetition frequency. Examples of such motors today are known as synchronous motors, synchronous reluctance motors, synchronous linear induction motors, stepping motors, and digitally synchronized d.c. linear motors, etc. which may be considered as synchronize type motors.

As will be set forth, the relatively few components mentioned above provide an inherently clean-air, low noise, precision maneuverable vehicle without additional units for such features. It will also be seen that these same components provide power steering, dynamic braking, and an automatic fixed-speed operation; again with no additional units. Finally, since the control signals are of the same nature as automated highway guidance signals, only electronic detection and amplification units are needed for such control. Elaborate energy conversion or servomechanism systems are not required.

Other adaptabilities and capabilities of the invention will appear as the description progresses, reference being had to the accompanying drawings, in which:

DESCRIPTION OF THE PREFERRED EMBODIMENTS

An important feature of this invention is that the electric drive motors used as propulsion means be considered and controlled in pairs. Based on this consideration a suitable configuration (at least in initial prototype) is a three-wheeled vehicle. Inasmuch as the driven pair of wheels are mounted abreast in the tri-wheel design, the single third wheel provides stability and manual steering. In addition, the tri-wheel design allows maximum maneuverability with a minimum of complexity in the mechanical design of the steering mechanism. Optionally, this third wheel may be mounted either in the front or rear of the vehicular structure.

A control system according to the invention comprises at least two electric motors of specific type as explained otherwise herein which are operated in "synchronized differential pairs," an accelerator control which varies the mechanical input to a transducer, such transducer then controlling a variable-frequency pulse-generator electric circuit so that the frequency of the output signal is proportional to the accelerator control position, a steering control which varies the mechanical input to a set of transducers, such set of transducers acting upon frequency-dividing electric circuits so that the frequencies of their outputs are varied differentially in proportion to the direction and displacement of the steering control, an electric control circuit which determines the appropriate time-sharing periods for battery charging and the signal application connections for desired motor operations, a group of controlled power switches which allow signal currents of ample magnitude to drive the electric motors, a four-way direction control unit by which an operator applies an electrical signal to determine the desired operating mode of the electric motor pair, an electric power source, and a controlled power switch circuit to determine the appropriate time-sharing periods during which the battery can be charged.

Figure 1:
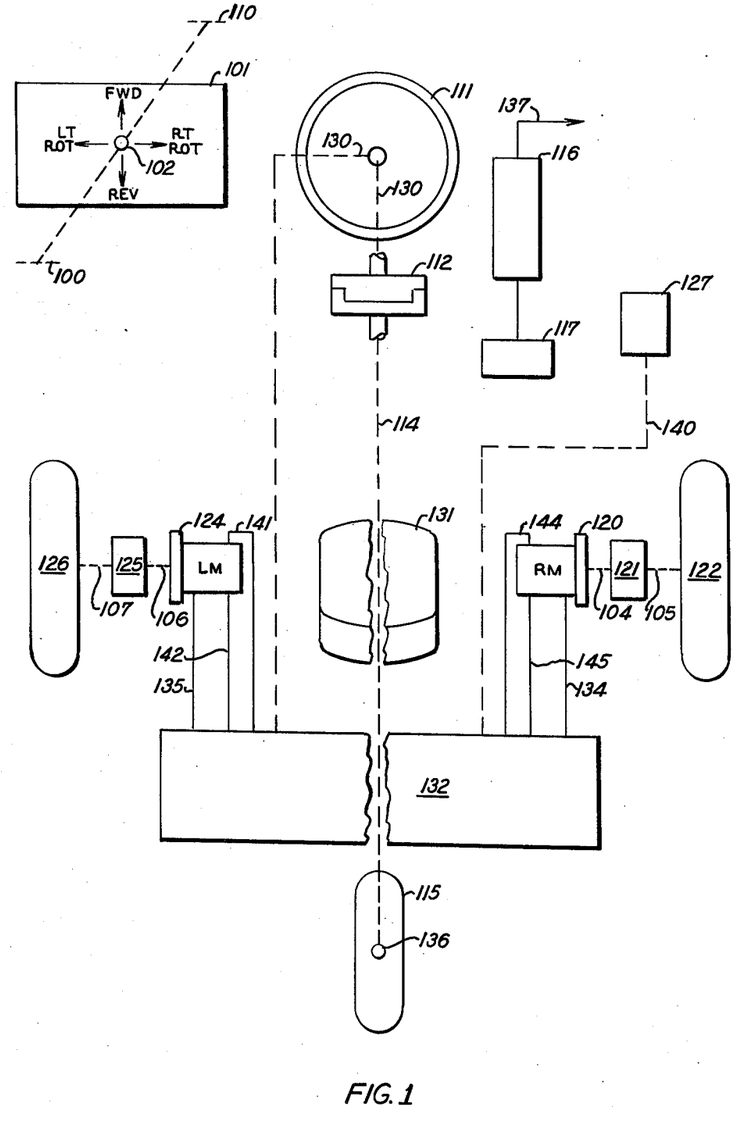
FIG. 1 is a diagrammatic representation of the major mechanical components typical of a vehicle capable of being controlled by the invention.

The general configuration of a mechanical apparatus suitable for demonstrating the operation of the invention is shown in FIG. 1. Referring to such figure, the primary components are the right motor 120, the left motor 124, and the electric control system 132.

An operator of driver seat 131 typical for mobile vehicles is furnished. A steering control 111 provides the operator with manual means for controlling of the direction of motion of the vehicle. Steering control 111 is shown by dotted lines 114 mechanically linked through a clutch release 112 whereby it is mechanically capable of rotating a third wheel 115 through its suspension coupling 136 to the proper angle for the desired turning radius. Steering control 111 is also mechanically linked by means of coupling 130, illustrated in dotted lines, to operate a set of transducers associated with electric control system 132. An accelerator pedal 127 is provided to allow operator control of the speed of the vehicle. Accelerator pedal 127 is mechanically linked by means of coupling 140, shown in dotted lines, to a further transducer associated with electric control system 132. A typical conventional brake fluid system gives the operator command of vehicle inertia so that the vehicle can be slowed or stopped by application of pressure to brake pedal 117, which mechanically compresses brake cylinder 116 and distributes hydraulic pressure through brake lines indicated by reference numeral 137, to the traction wheels 122 and 126. A direction control lever 100, indicated in dotted lines, is provided for a function comparable to typical gear-shift or automatic-drive shift levers. By appropriate manipulation of direction control lever 100, the operator selects one of four operating modes: FORWARD, REVERSE, RIGHT ROTATION, LEFT ROTATION. As illustrated in FIG. 1, a fifth neutral central position is provided whereby the operator is required to return to such neutral position before another mode is selected. Direction control lever 100 is pivotable through pivot 102, and continues into a mechanism box 101 which houses mechanical linkages and couplings to activate electrical connections requisite for each selected mode. One such activation involves a coupling 110, which positions a four-way switch in a manner which will be discussed hereinafter.

The electric motor drive system comprises right motor 120, left motor 124, a right mechanical coupling 121, a left mechanical coupling 125, a right traction wheel 122, and a left traction wheel 126. A power cable 134 serves as the common electric power lead to right motor 120. A further power cable 144 provides for forward motor rotation and a still further power cable 145 provides reverse rotation. An output shaft 104 mechanically drives right mechanical coupling 121 which transmits rotation to axle 105 of right traction wheel 122, shaft 104 and axle 105 being indicated by dotted lines. Similarly, a power cable 135 serves as the common electric power lead to left motor 124; power cable 141 provides forward motor rotation; and a power cable 142 provides reverse motor rotation. An output shaft 106 mechanically drives a left mechanical coupling 125 which transmits rotation to axle 107 of left traction wheel 126, shaft 106 and axle 107 being shown in dotted lines. Mechanical couplings 121 and 125 may be a direct connection, gearing, belt drive, or complex transmission, as desired. Except for the motors 120 and 124, suitable substitutes and known designs may be utilized for the mechanical components, as well as the chassis and body design. Being well known in the art, it would serve no useful purpose to describe some in detail.

Figure 2:
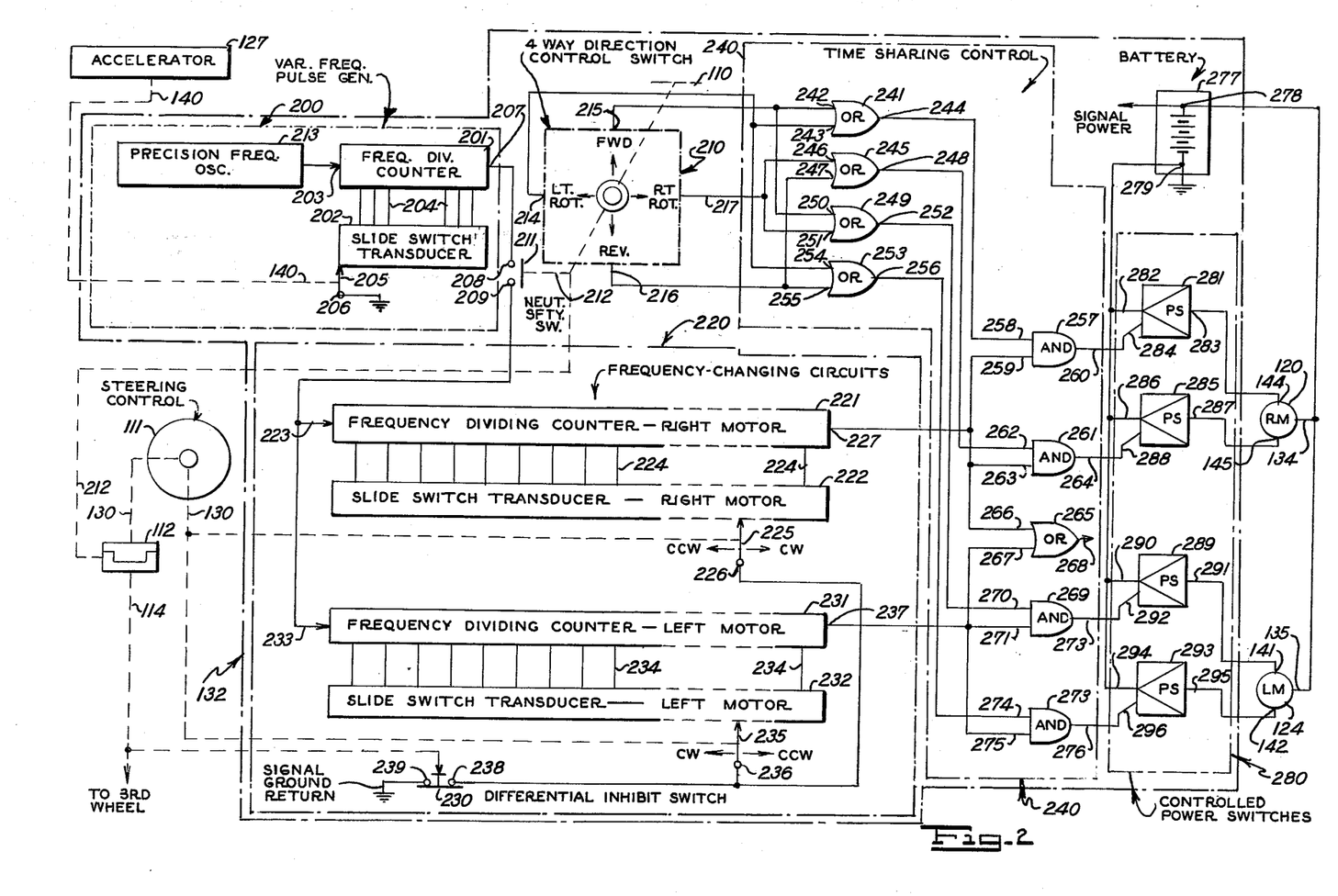
FIG. 2 is a schematic diagram of an electrical precision means according to the invention which utilizes digital logic capability of controlling electric motors.
Figure 3:
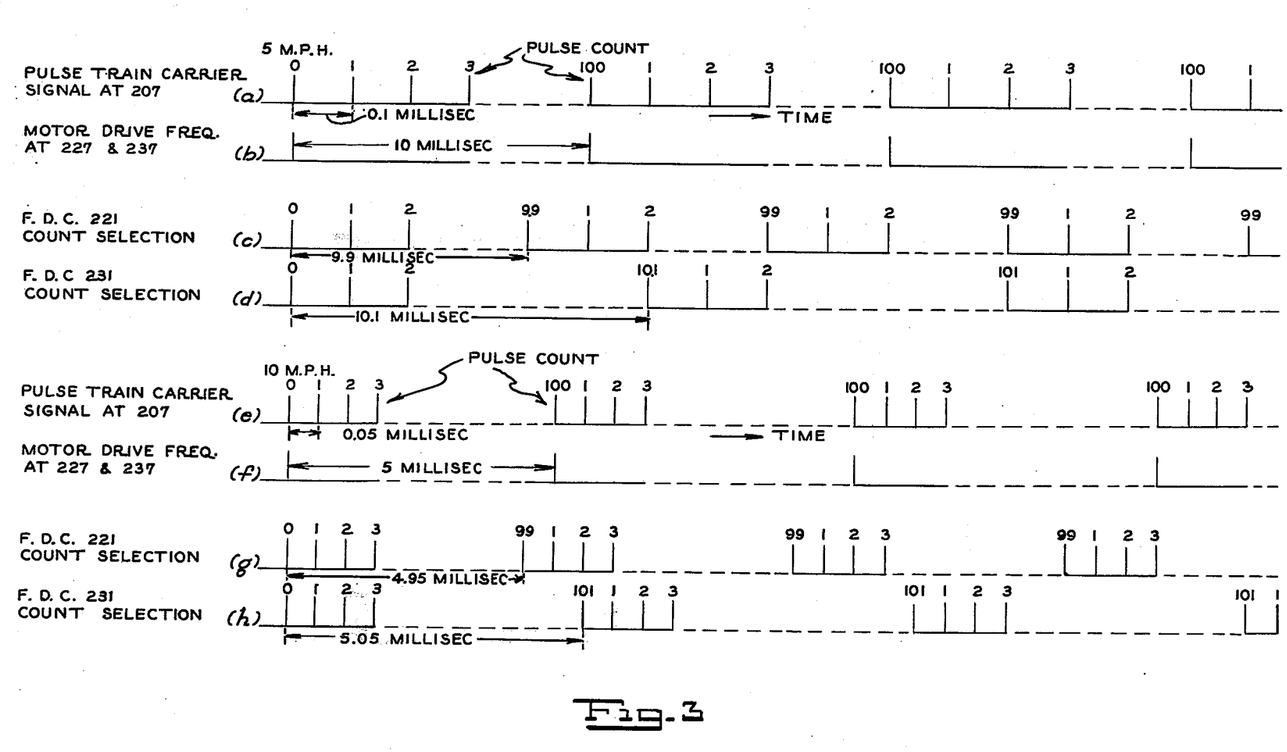
FIG. 3 constitutes timing diagrams related to the pulse-trains of the frequency-changing circuits under different operational conditions.
Figures 4, 5:
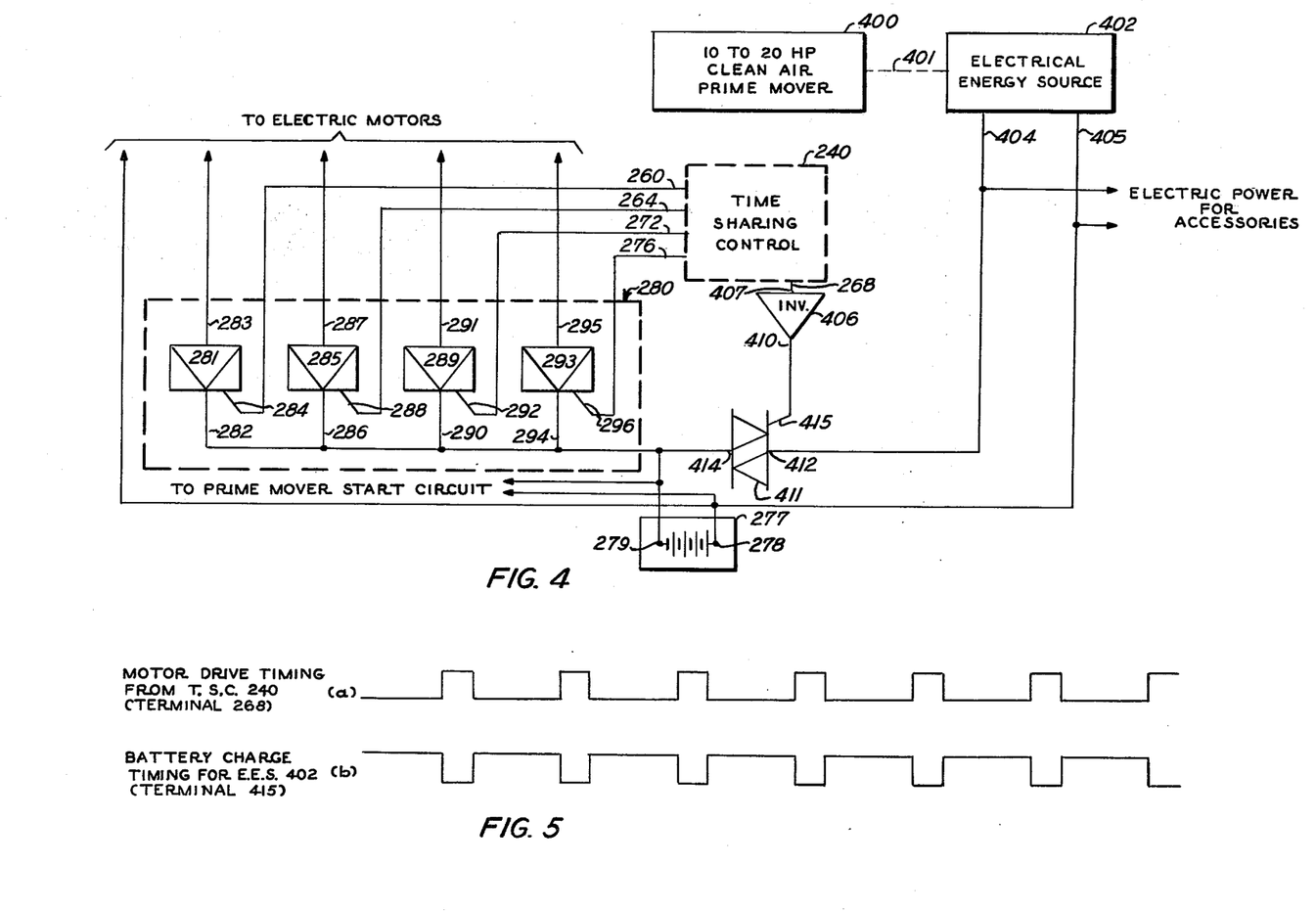
FIG. 4 is a schematic diagram of a time-sharing battery-charging technique for an intermediate hybrid combination in accordance with the invention.
FIG. 5 is a timing diagram showing the relationships for the time-sharing technique.
Figure 6:
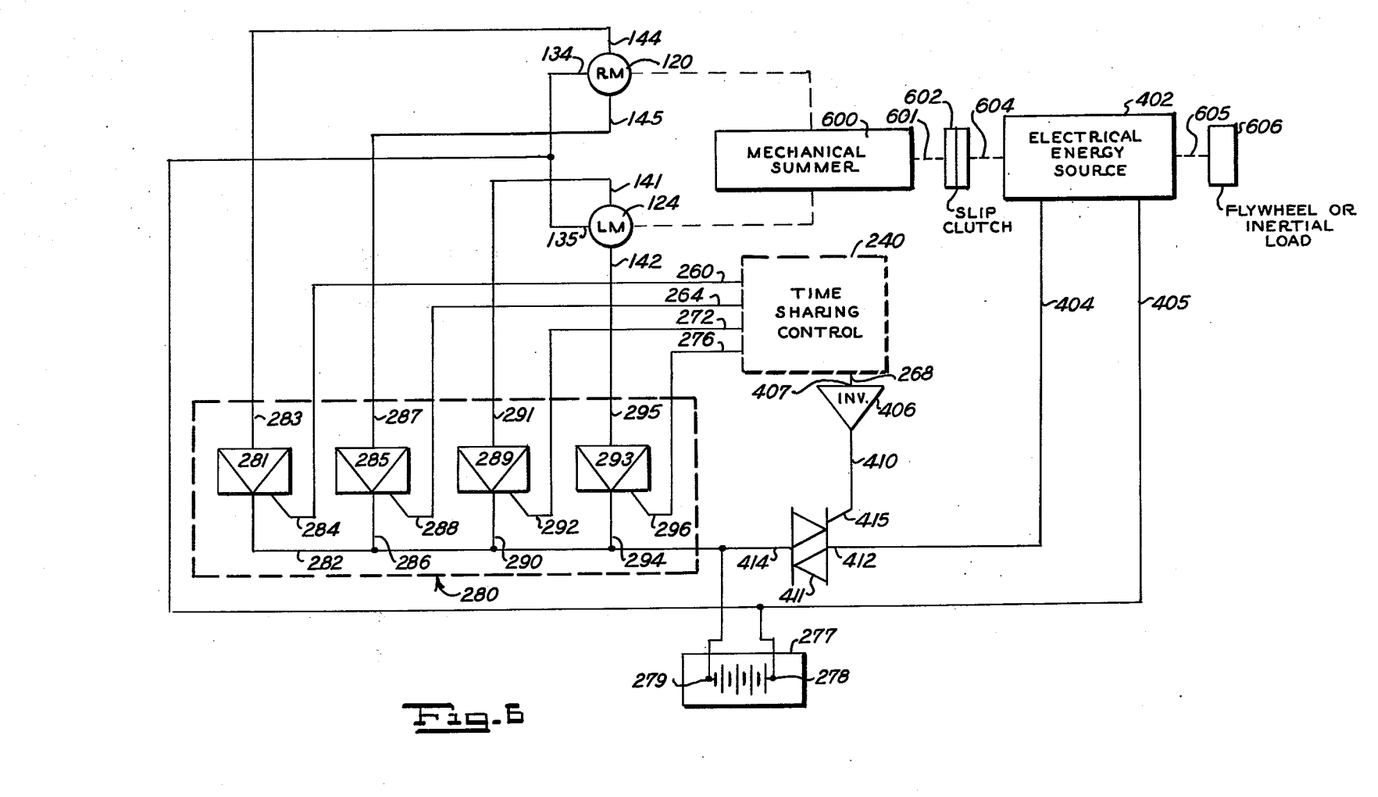
FIG. 6 is a schematic diagram of a time-sharing battery-charging technique which utilizes flywheel or inertial energy.

Having described the general requirements and components of mechanical apparatus to which the invention herein is applied, a more detailed description of the elements, particularly electrical and electronic elements, of the invention, follows. FIGS. 2, 4, and 6 show schematically electrical elements and circuits directed to important essentials of the invention. FIGS. 3 and 5 furnish diagrams of electrical signal timing relationships which are pertinent to the operation and sequence of events.

Components of electrical control system 132 which apply to motor drive capability are shown in FIG. 2. Although the schematic symbology used in such Figure relates to contemporary semiconductor and integrated-circuit technology, it will be appreciated that other components and circuitry exist and it is within the skill of the art to provide equivalents. Accordingly, inasmuch as many known integrated-circuit and semiconductor parts meet functional requirements of the invention, as well as provide miniaturization, there is no intention to place any limitation on the use of vacuum tubes, relays (or other electrical or hybrid components) which are capable of performing the desired functions within the applicable timing and operational parameters. With this in mind, the description of system 132 and its functional requirements follows. The operator's controls which interface with system 132 include accelerator pedal 127, steering control 111, and direction control lever coupling 110. With reference to accelerator pedal 127, it connects into electrical control system 132 through coupling 140, which functions mechanically to position transducer 202. Transducer 202 converts the mechanical positioning into an electrical output from a variable frequency pulse generator which is designated generally by reference numeral 200. The transducer-controlled variable-frequency pulse generator 200 may incorporate any of a number of well-known standard circuits such as Wein bridge oscillator, a uni-junction transistor oscillator, or any other design which produces an electrical signal pulse train with pulse repetition frequency which can be varied. Transducer 202 may be a potentiometer, a variable capacitor, a variable inductor, or any other of a number of functionally equivalent electrical components or combination of electrical components.

The variable frequency pulse generator includes a precision frequency oscillator 213 which is connected through a terminal 203 to the frequency dividing counter 201. Counter 201 is connected by data lines 204 to transducer 202 governed by movement of a wiper 205 which is mechanically linked to accelerator pedal 127 by a coupling 140. Signals from the generator 200 are in the form of a pulse train carrier at 207 and are transmitted to the frequency changing circuits 220 via a neutral safety switch 211 which, when closed, electrically connects terminals 208 and 209.

Steering control 111 interfaces with electrical control system 132 through coupling 130, which mechanically positions transducers 222 and 232. The purpose of transducers 222 and 232 is to act upon frequency changing circuits designated generally 220 to which the pulse train output of the variable-frequency pulse generator 200 is applied. Because the pulse train output from generator 200 is of much higher frequency than that which is suitable for direct application to electric motors 120 and 124, circuits 220 product a heterodyne effect which results in signals at frequencies much lower than the applied pulse train frequency from generator 200, but which nevertheless vary proportionately as the frequency of such pulse train varies. If steering control 111 is centered, motor drive frequencies at terminals 227 and 237 are equal, the wipers 225 and 235 being initially adjusted to produce equal frequencies. However, as steering control 111 is displaced to the right, wiper 225 is moved in a direction to produce a differentially lower motor drive frequency at terminal 227, while wiper 235 simultaneously moves in a direction to produce a differentially higher motor drive frequency at terminal 237. Conversely, as steering control 111 is displaced to the left, wiper 225 moves in such direction to produce a differentially higher motor drive frequency at terminal 227, while wiper 235 simultaneously moves in such direction as to produce a differentially lower motor drive frequency at terminal 237. Thus, the combined purpose of frequency-changing circuits 220 is first to produce two equal motor drive frequencies which are applied to a "synchronized differential pair" of electric drive motors 120 and 124 and so determine a fixed, locked-in speed proportional to such frequency; and also to produce an incremental frequency differential between the two motor drive frequency signals, said frequency differential being proportional to the displacement of a steering command mechanism, whereby such signals applied to a "synchronized differential pair" of electric drive motors results in two fixed and locked-in, but incrementally different, motor speeds.

The electrical inputs to the frequency changing circuits 220 comprise a pair of terminals 223 and 233 which connect through safety switch 211 to terminal 207 and lead into the frequency dividing counters 221 and 231 respectively. Counter 221 connects via data lines 224 to transducer 222 and counter 231 connects to transducer 232 via data lines 234.

It will be noted that wipers 205, 225 and 235 each connect through their pivots 206, 226, and 236 respectively to electrical grounds, there being, however, a differential inhibiting switch 230 which as shown in the diagram of FIG. 2 is closed against terminals 238 and 239 and is involved only with terminals 226 and 236.

A third operator interface with electric control system 132 involves the direction control lever coupling 110 which activates a five position four-way direction control switch 210. In the centered or neutral position, all four output terminals 214, 215, 216, and 217, are electrically grounded, and serve to prevent any electrical operation. As an added safety feature, a mechanical linkage 212 releases and opens a neutral safety switch 211 which prevents a pulse train carrier from 207 of generator 200 from activating frequency-changing circuits 220. However, in any of the four operating mode positions of four-way direction control switch 210, neutral safety switch 211 is closed. When the forward operating mode is selected, a constant source voltage level appears at terminal 215, while terminals 216, 217, and 214 remain electrically grounded. When the reverse operating mode is selected, a constant source voltage level appears at terminal 216, while terminals 215, 219, and 214 remain electrically grounded. When the right rotation operating mode is selected, a constant source voltage level appears at terminal 217, while terminals 216, 214 and 215 remain electrically grounded. Finally, when the left rotation operating mode is selected, a constant source voltage level appears at terminal 214, while terminals 215, 216 and 217 remain electrically grounded. Known five position switches of the aircraft type available from several manufacturers may be adapted to function as four-way direction control switch 210.

The above description relates to the functions of circuits controlled by operator interface. The next circuit to be described utilizes the outputs of the four-way direction control switch 210 and of the frequency-changing circuits 220, and combines them to produce electrical signals which, after suitable application to electric drive motors 120 and 124 determines their speed and direction of rotation. Such next circuit is referred to generally as time-sharing control 240. The symbolism utilized is borrowed from semiconductor technology, and is displayed in a general form which will be recognized as Boolean Algebra positive logic. However, a brief discussion should be sufficient for an understanding of the functional operation without resorting to additional study. In this circuit, the components used are required to switch between two voltage levels, one usually being zero (or ground) voltage, the other being source (or battery) voltage. The switching speeds depend upon design requirements, so relatively sluggish devices (such as relays) may accomplish some functions but not others. Just two types of logic elements are depicted, the AND-gate circuit component and the OR-gate circuit component. Each gate has three terminals, two input terminals and one output terminal. It is desirable that these terminals be electrically isolated from each other, and it is also desirable that the gates be unilateral in their electrical action from input to output. The logic operation of the OR-gate is such that with zero voltage on both of the two input terminals, the output voltage also remains at the zero voltage level; but as soon as the voltage on one or the other input terminal is switched to the source level, the output voltage also switches to the source level. The logic operation of the AND-gate is such that with zero voltage on both of the two input terminals, the output voltage remains at the zero voltage level. If only one or the other voltage on the input terminals switches to the source level, the output voltage remains at the zero voltage level. But if the voltage on one and the other input terminals is at the source level, the output voltage switches to the source level. As an aid to recognition of function, the five OR-gates 241, 245, 249, 253, and 265 have "OR" applied in the center of the symbol, while the four AND-gates 257, 261, 269, and 273 have "AND" applied in the center of the symbol. There are five outputs from time-sharing control 240. They are: output terminal 260 of AND-gate 257, output terminal 264 of AND-gate 261, output terminal 272 of AND-gate 269, output terminal 276 of AND-gate 273, and output terminal 268 of OR-gate 265, all of which connect to components in other circuits as shown and will be described.

It is to be noted that time-sharing control 240 includes a number of input and output terminals for the OR-gates and the AND-gates. Thus, OR-gate 241 has a pair of input terminals 242 and 243 and an output terminal 244. Similarly, OR-gate 245 has input terminals 246 and 247 and an output terminal 248. OR-gate 249 has input terminals 250 and 251 and an output terminal 252. OR-gate 253 has input terminals 254 and 255 and an output terminal 256.

The OR-gate 265 having the output terminal 268 includes two input terminals 266 and 267. In a like manner, the AND-gates 257, 261, 269 and 273 include input terminals 258 and 259, 262 and 263, 270 and 272, and 274 and 275, respectively, and include output terminals 260, 264, 272, and 276, respectively.

As indicated above, time-sharing control 240 produces electrical signals which determines the speed and direction of rotation of electric drive motors 120 and 124. Another circuit is provided to receive control signals from time-sharing control 240 for the purpose of properly matching the electrical connection, power, and characteristics of the drive motors. In this respect, it is to be understood that the particular electrical circuit and connections depends upon the design and type of electric motors selected. Therefore, the circuits of FIG. 2 are limited in detail to that which generally describes the function of any specific components or connections used as necessary to impart an understanding of the invention to one skilled in the art. The motor driving circuits are referred to generally as controlled power switches 280, and may include any semiconductor, vacuum tube, gas tube, relay, electrical, electromechanical, or hybrid switching components for controlling the operation of a selected pair of electric drive motors at desired speeds and directions of rotations within the ratings and operating range capabilities of the motors.

The circuit for the control power switches, 280, comprises four power switches 281, 285, 289 and 293. Each such power switch has a motor connected terminal 283, 287, 291 and 295, respectively, battery connected terminals 282, 286, 290 and 294 respectively, and control terminals 284, 288, 292, and 296, respectively, carrying signals from the corresponding AND-gates.

A further circuit consideration of electric control system 132 concerns the electric power source or battery 277. The characteristics of this component depend largely upon the specific type of electric drive motors 120 and 124 used in the invention; that is, the voltage characteristic is primarily determined by the voltage requirements of the motors.

It will be noted that battery 277 includes terminals 278 and 279, the latter being electrically grounded and connected to the power switches 281, 285, 289 and 293 as shown. Terminal 278 supplies the signal power for all electronic circuits and connects to the motors 120 and 124 as indicated in the circuit diagram of FIG. 2.

FIGS. 4 and 6 concern circuits which are part of electrical control system 132 but are set forth in separate Figures for clarity. These diagrams depict the essentials of a compatible battery-charging technique which utilizes converted mechanical energy to drive an electrical energy source capable of charging the battery on a time-sharing duty cycle basis. Such a technique allows the battery to supply the peak power pulsed demands of electric drive motors 120 and 124, whereby less stringent demands are imposed on the requirements of an electrical energy source which charges the battery during dead times of the motor duty cycles. FIG. 4 illustrates a hybrid approach in which a vehicle carries a prime mover 400 which provides mechanical energy to drive an electrical energy source 402 via a coupling 401 indicated in dotted lines. Prime mover 400 may be any ten to twenty horsepower, clean air engine; be it steam-driven, gas-turbine, diesel, gasoline or other type. Electrical energy source 402 is a typical electric generator or electric alternator which is compatible, of course, with the requirements of the battery 277. Battery charge timing is provided by the time-sharing control 240, through a signal from output terminal 268 of OR-gate 265. An inverter amplifier 406 provides the correct positive logic polarity to power switch 411, which, when activated, closes the electrical return cable of electrical energy source 402 during the dead time of the motor duty cycle. Power switch 411 may include any semiconductor, vacuum tube, gas tube, relay, electrical, electromechanical, or hybrid switching component of suitable ratings and timing characteristics which has the capacity to allow or prevent current flow from electrical energy source 402. However, the symbol shown for power switch 411 is representative of a known semiconductor device capable or working with both a.c. and d.c. currents. A well known commercial device is sold under the trade name, "TRIAC."

The energy source 402 has terminals 404 and 405, the terminal 404 leading to a power switch 411 which includes terminals 412 and 414 and a control terminal 415 which leads from inverter 406. The inverter has an input terminal 407 and an output terminal 410 and is unilateral in electrical action from input to output. Otherwise, the components in FIGS. 4 and 6 are designated by the same reference numerals as applied in FIGS. 1 and 2.

Mechanical energy required to drive electrical energy source 402 is derived from vehicle inertial energies, such as down-hill gravitational energy, plus some inertial energy due to flywheel storage of imparted motor impulse energies. The system is depicted schematically in more detail in FIG. 6, in which the output shaft impulse energies of motors 120 and 124 are sampled and combined through a mechanical summer 600 (which may be a differential gear train) having an output shaft 601 which drives an input shaft 604 (both shafts illustrated by dotted lines) of electrical energy source 402 through slip clutch 602. Flywheel 606 is mechanically connected to electrical energy source 402 by means of a shaft coupling indicated by dotted lines 605 and serves to store introduced inertial energies which continue to rotate electrical energy source 402 for some period after the introduced energies cease. The use of these energies to charge the battery is as described in the previous paragraph.

An operator, seated in driver seat 131, positions direction control lever 100 to neutral, and energizes the system by a key-controlled switch. Both motor power and signal power are thereby provided to all electrical circuits, but the only circuit capable of generating a signal frequency is in the variable frequency pulse generator 200 (FIG. 2). As soon as signal power is applied to a precision frequency oscillator 213, which comprises a commercially available precision crystal-controlled or tuning-fork controlled oscillator, a stable electrical signal frequency is generated and applied as an input to terminal 203 of the frequency-dividing counter 201. With accelerator pedal 127 in released position, the mechanical linkage of coupling 140 is so adjusted to situate wiper 205 of slide switch transducer 202 in an extreme cut-off position which results in an output pulse train carrier at 207 of zero frequency (that is, no output pulse train signal is produced). However, even if the operator inadvertently depresses accelerator pedal 127, any output signal of pulse train carrier at 207 is prevented from being applied because the neutral position of direction control lever 100 is mechanically arranged to open the neutral safety switch 211. Thus, the only electrical power consumed by the vehicle in its stationary or motionless condition is the comparatively small amount of signal power used by the electrical circuits.

The operator now has a choice of four operating modes; forward, reverse, right rotation, or left rotation. Each operating mode will be described in turn with the corresponding circuit connections and electrical performance outlined in detail.

Assuming the vehicle is located so that it can proceed in any selected operating mode without obstruction, the operator selects the forward operating mode by moving direction control lever 100 to the forward position. This action is transmitted mechanically through pivot 102 to direction control lever coupling 110 which closes neutral safety switch 211 by means of mechanical linkage 212 and activates four-way direction control switch 210 so that a constant source voltage level appears at terminal 215, while terminals 214, 216 and 217 remain electrically grounded. This constant source voltage level is transmitted by electrical connection to input terminal 242 of OR-gate 241, and also to input terminal 250 of OR-gate 249. The logic operation of OR-gate 241 immediately switches its output terminal 244 to the constant source voltage level, which is transmitted by electrical connection to input terminal 258 of AND-gate 257. The logic operation of OR-gate 249 immediately switches its output terminal 252 to the constant source voltage level, which is transmitted by electrical connection to input terminal 270 of AND-gate 269. The logic operation of AND-gate 257 maintains its output terminal 260 at zero voltage, since its input terminal 259 is still at zero voltage. The logic operation of AND-gate 269 also maintains its output terminal 272 at zero voltage, since its input terminal 271 is still at zero voltage. Thus, no further electrical action occurs, and the operator is now ready to execute the action which will initiate motion. When accelerator pedal 127 is depressed, the mechanical linkage of coupling 140 displaces wiper 205 of slide switch transducer 202 from its cutoff position where a signal from counter 201 (pulse train carrier at 207) of gradually increasing frequency is produced. This is accomplished in the following manner. As previously indicated, precision frequency oscillator 213 has been operating since electric power was applied, and has been generating a stable electrical signal frequency which is electrically connected to terminal 203 of frequency-dividing counter 201. The magnitude of the frequency at this point is many thousands of times higher than that which can be practically used as an operating frequency for the electric drive motors 120 and 124. Frequency-dividing counter 201, however, comprises a group of shift register logic elements so connected as to form a divide-by-N counter, such counter producing an output pulse for every Nth input pulse, where N is determined by the setting of slide switch transducer 202, which selectively grounds the proper combination of electrical connections, illustrated as data lines 204, in a predetermined sequence. Thus, as wiper 205 is displaced from cut-off position, it first selects the highest dividing number N, which for purposes of discussion may be two hundred and twenty-five, and thereafter sequentially select lower dividing numbers until the design minimum is reached, which may be as low as two. This corresponds to an available frequency variation of pulse train carrier at 207 ranging from a low of 1/225 of the precision oscillator frequency, to a maximum of 1/2 of the precision oscillator frequency (that which is applied at terminal 203). This range also corresponds to the accelerator pedal 127 displacement from its released position to its "floored" position. But, in actual magnitude, however, this range is still higher than is practical as an operating frequency for the electric drive motors.

Pulse train carrier at 207 is transmitted by electrical connection to terminal 208 of neutral safety switch 211, and since this switch is now closed, the signal proceeds to terminal 209, from which it is transmitted by electrical connection to frequency-changing circuits 220. It is to be seen that terminal 209 is electrically connected to terminal 223 of frequency-dividing counter 221, and also to terminal 233 of frequency-dividing counter 231. Frequency-changing circuits 220 are also in the form of divide-by-N counters, where N is determined by the setting of slide switch transducers — thus providing certain design standardization with frequency-dividing counter 201 and slide switch transducer 202. In the arrangement shown, the combination of frequency-dividing counter 221 and slide switch transducer 222 comprise a programmable divider, which by sequentially selecting a group of data lines 224, determines the motor drive frequency at 227 which is applied to right motor 120 only. Also, the combination of frequency-dividing counter 231 and slide switch transducer 232 comprises a programmable divider, which by sequentially selecting a group of data lines 234, determines the motor drive frequency at 237 which is applied to left motor 124 only. These two programmable dividers are identical in design and differ in operation only to the extent that their wipers are mechanically linked to displace in opposite directions, so as to select simultaneously dividing factor N in predetermined but inverse sequences. Referring to FIG. 2, it is noted that steering control 111 is mechanically linked by coupling 130 to displace wiper 225 of slide switch transducer 222 and wiper 235 of slide switch transducer 232 simultaneously. However, the linkage is initially adjusted so that both wipers select the same dividing factor N, which for purposes of discussion may be one hundred and corresponds to a centered or "zero-turn" position of steering control 111. Returning now to the pulse train carrier from 207 which appears at terminals 223 and 233, it is seen that its frequency (which has been determined by displacement of accelerator pedal 127) is now further divided equally by frequency-dividing counter 221 and frequency-dividing counter 231, each by the same factor of one hundred, provided that the operator maintains steering control 111 in the centered or "zero-turn" position. The output signal of frequency-dividing counter 221 is in the form of a pulse train motor drive frequency at 227, which is transmitted by electrical connection to input terminal 259 of AND-gate 257, to input terminal 263 of AND-gate 261, and to input terminal 266 of OR-gate 265. The output signal of frequency-dividing counter 231 is in the form of a pulse train motor drive frequency at 237, which is transmitted by electrical connection to input terminal 267 of OR-gate 265, to input terminal 271 of AND-gate 269, and to input terminal 275 of AND-gate 273. Recalling that input terminal 258 of AND-gate 257 is already at the constant source voltage level, the logic operation of AND-gate 257 allows the pulse train at motor drive frequency from 227 to appear at output terminal 260, which is then transmitted by electrical connection to control terminal 284 of power switch 281. Also, recalling that input terminal 270 of AND-gate 269 is already at the constant source voltage level, the logic operation of AND-gate 269 allows the pulse train at motor drive frequency from 237 to appear at output terminal 272, which is then transmitted by electrical connection to control terminal 292 of power switch 289. The logic operation of AND-gate 261 is inhibited because input terminal 262 is at zero voltage, and similarly the logic operation of AND-gate 273 is inhibited because input terminal 274 is at zero voltage. Finally, the logic operation of OR-gate 265 allows a pulse train to appear at output terminal 268 which is a time-combination of the pulse trains which are applied at its two input terminals. In this instance, the two input pulse trains are identical and synchronized, so that the pulse train at output terminal 268 is a duplicate of either input. This pulse train is used in the battery-charging technique which is yet to be discussed. To continue, the application of a pulse train to control terminal 284 of power switch 281 creates a low resistance path between terminal 283 and terminal 282 during that portion of the pulse train duty cycle when the control voltage is at the source level, and a high resistance (open circuit) path between terminal 283 and terminal 282 during that portion of the pulse train duty cycle when the control voltage is zero. Thus, there is a time-controlled electrical path from terminal 278 of battery 277, to terminal 134 of right motor 120 through the forward winding to terminal 144 of right motor 120, to terminal 283 of power switch 281, through the low resistance path to terminal 282 of power switch 281, and finally returning to terminal 279 of battery 277, thereby allowing high current pulses to drive right motor 120 in synchronism with the motor drive frequency from 227. In a like manner, there is a time-controlled electrical path from terminal 278 of battery 277, to terminal 135 of left motor 124, through the forward winding to terminal 141 of left motor 124, to terminal 291 of power switch 289, through the low resistance path to terminal 290 of power switch 289, and finally returning to terminal 279 of battery 277, thereby allowing high current pulses to drive left motor 124 in synchronism with the motor drive frequency from 237. Since both drive motors are rotating equally in the forward direction, both traction wheels 122 and 126 are driven at the same speed in the forward direction, and the vehicle proceeds in the forward direction at a speed corresponding to the motor drive frequencies.

For an understanding the effect of displacing the steering control 111 with the vehicle in motion, reference is made to FIG. 3. Assuming a vehicle speed of five miles per hour has been attained, and that the required frequency of pulse train carrier at 207 (which determines that speed) is 10,000 pulses per second (PPS), the timing diagram (a) of FIG. 3 illustrates such a pulse train. Recalling that pulse train carrier from 207 is applied as the input signal to terminal 223 of frequency dividing counter 221 and also to terminal 233 of frequency dividing counter 231, and that a centered position of steering control 111 determines the dividing factor N of both programmable dividers to be one hundred, then frequency dividing counters 221 and 231 are each producing one output pulse for each one hundred input pulses. Thus, the pulse train (a) of FIG. 3 with a period of 0.1 millisecond is converted into the pulse train (b) of FIG. 3 with a period of 10 milliseconds. This represents both motor drive frequencies at 227 and 237, and is a frequency of one hundred PPS. If now the operator displaces steering control 111 in order to change the direction of vehicle motion towards the left, some mechanical steering is obtained by means of coupling 130 through clutch release 112, and coupling 114, which act mechanically to position the third wheel 115 for a left turn. However, a power steering effect is produced simultaneously by traction wheels 122 and 126, because of the electrical series of events occurring in the frequency-changing circuits 220. As steering control 111 is displaced to the left, the linkage of coupling 130 displaces wiper 225 of slide switch transducer 222 in the direction which selects dividing factors N lower than one hundred, while simultaneously displacing wiper 235 of slide switch transducer 232 in the direction which selects dividing factors N higher than one hundred. Thus, it is seen in diagram (c) of FIG. 3 that for the first increment of displacement of steering control 111 to the left, frequency dividing counter 221 produces an output pulse for every ninety-nine input pulses, increasing the motor drive frequency at 227 incrementally. Also, it is seen in diagram (d) of FIG. 3 that for the same increment of displacement of steering control 111 to the left, frequency dividing counter 231 produces an output pulse for every one hundred and one pulses, decreasing motor drive frequency at 237 incrementally. As steering control 111 is displaced further to the left, the dividing factors N increasingly diverge (98 - 102, 97 - 103, 96 - 104, etc.), until some maximum turning radius divergence is attained (assume 80 - 120). Under these conditions, the pulse train of motor drive frequency at 227 has a period of 8 milliseconds (or a frequency of 125 PPS), while the pulse train of motor drive frequency at 237 has a period of 12 milliseconds (or a frequency of 83.3 PPS). Thus, right motor 120 is now being driven by a frequency of 125 PPS, while left motor 124 is simultaneously being driven by a frequency of 83.3 PPS. The effect on the differentially driven traction wheels 122 and 126 determines the effective turning radius for the vehicle.

If the operator now centers steering control 111 so that the vehicle is again moving straight ahead, and the accelerator pedal 127 is depressed further to increase the vehicle speed, the following events occur assuming linear relationships throughout. The timing diagrams (e) through (h) of FIG. 3 show the result of settling at a higher speed of say, 10 miles per hour. As illustrated in diagram (e) of FIG. 3, pulse train carrier at 207 now has a period of 0.05 milliseconds, or a frequency of 20,000 PPS. However, the programmable dividers are still set for a dividing factor N of one hundred, so motor drive frequency at 227 and 237 each have a period of 5 milliseconds, or a frequency of 200 PPS, as seen in diagram (f) of FIG. 3. As the operator again displaces steering control 111 for a left turn, the same incremental steps of divergency occur as before, until the limit is reached (80 – 120), as seen in diagrams (g) and (h) of FIG. 3. On this occasion the pulse train of motor drive frequency at 227 has a period of 4 milliseconds or a frequency of 250 PPS, while the pulse train of motor drive frequency at 237 has a period of 6 milliseconds or a frequency of 166.6 PPS. Thus, right motor 120 is now being driven by a frequency of 250 PPS, while left motor 124 is simultaneously being driven by a frequency of 166.6 PPS. It is to be understood that at double the previous nominal speed, the turning radius is the same for the same steering displacement. However, if a composite linkage is provided to allow accelerator pedal 127, in addition and responsive to steering control 111, to displace the transducer wipers 225 and 235 simultaneously incrementally in opposite directions, the combined effect is to provide an increased or decreased steering wheel sensitivity, as desired. Thus, if the percentage incremental displacement of the wipers is allowed to increase with speed, the turning radius decreases thus giving greater steering wheel sensitivity. If the percentage incremental displacement is allowed to decrease with speed, the turning radius is increased thus giving lesser steering wheel sensitivity.

It is not considered necessary to set forth in detail that when steering control 111 is displaced to the right from the centered position, the roles of the programmable dividers are reversed, The pulse train count diagrams (c) and (g) of FIG. 3 then apply to frequency dividing counter 231, while the pulse train count diagrams (d) and (h) of FIG. 3 apply to frequency dividing counter 221. The resulting action is that left traction wheel 126 is driven at a higher speed, while the right traction wheel 122 is driven at a lower speed, thus determining a turning radius to the right.

To select the reverse operating mode, the operator brings the vehicle to a complete stop, and returns direction control lever 100 to the neutral position. This action disconnects all previous direction determining electrical circuit connections, opens neutral safety switch 211, and maintains a general ready status prior to another selection. The operator then selects the reverse operating mode by moving direction control lever 100 to the reverse position. This action is transmitted mechanically through pivot 102 to direction control lever coupling 110 which closes neutral safety switch 211 by means of mechanical linkage 212, and activates the four-way direction control switch 210 so that a constant source voltage level appears at terminal 216, while terminals 215, 217, and 214 remain electrically grounded. This constant source voltage level is transmitted by electrical connection to input terminal 247 of OR-gate 245, and also to input terminal 255 of OR-gate 253. The logic operation of OR-gate 245 immediately causes its output terminal 248 to switch to the constant source voltage level, which is transmitted by electrical connection to input terminal 262 of AND-gate 261. The logic operation of OR-gate 253 immediately causes its output terminal 256 to switch to the constant source voltage level which is transmitted by electrical connection to input terminal 274 of AND-gate 273. The logic operation of AND-gate 261 maintains its output terminal 264 at zero voltage, since its input terminal 263 is still at zero voltage. The logic operation of AND-gate 273 maintains its output terminal 276 at zero voltage, since its input terminal 275 is still at zero voltage. Thus, no further electrical action occurs and the operator is now ready to execute the action to initiate motion. When accelerator pedal 127 is depressed, the mechanical linkage of coupling 140 displaces wiper 205 of slide switch transducer 202 away from its cutoff position so that a pulse train carrier at 207 of gradually increasing frequency is produced. As before, the pulse train carrier at 207 is transmitted by electrical connection to terminal 208 of neutral safety switch 211, and since this switch is now closed, proceeds to terminal 209, from which it is transmitted by electrical connection to frequency-changing circuits 220, thus appearing at terminal 223 of frequency-dividing counter 221, and also at terminal 233 of frequency dividing counter 231. As discussed for the forward direction, the frequency of pulse train carrier from 207 is further divided equally by frequency-dividing counter 221 and frequency-dividing counter 231, each by the same factor of one hundred, provided the operator maintains steering control 111 in the centered or "zero-turn" position. The output signal of frequency-dividing counter 221 is in the form of a pulse train motor drive frequency at 227, which is transmitted by electrical connection to input terminal 259 of AND-gate 257, to input terminal 263 of AND-gate 261, and to input terminal 266 of OR-gate 256. The outer signal of frequency-dividing counter 231 is in the form of a pulse train motor drive frequency at 237, which is transmitted by electrical connection to input terminal 267 of OR-gate 265, to input terminal 271 of AND-gate 269, and to input terminal 275 of AND-gate 273. Recalling that input terminal 262 of AND-gate 261 is already at the constant source voltage level, the logic operation of AND-gate 261 allows the pulse train at motor drive frequency from 227 to appear at output terminal 264, and is then transmitted by electrical connection to control terminal 288 of power switch 285. Also, recalling that input terminal 274 of AND-gate 273 is already at the constant source voltage level, the logic operation of AND-gate 273 allows the pulse train at motor drive frequency from 237 to appear at output terminal 276, and is then transmitted by electrical connection to control terminal 296 of power switch 293. The logic operation of AND-gate 257 is inhibited because input terminal 258 is at zero voltage, and the logic operation of AND-gate 269 is inhibited because input terminal 270 is at zero voltage. Finally, the logic operation of OR-gate 265 allows a pulse train to appear at output terminal 268 as with forward operation, which is used in the battery-charging technique to be discussed later. The application of a pulse train to control terminal 288 of power switch 285 allows a time-controlled low resistance path between terminal 287 and terminal 286. Similarly, the application of a pulse train to control terminal 296 of power switch 293 allows a time-controlled low resistance path between terminal 295 and terminal 294. Thus, there is a time-controlled electrical path from terminal 278 of battery 277, to terminal 134 of right motor 120, through the reverse winding to terminal 145 of right motor 120, to terminal 287 of power switch 285, through the low resistance path to terminal 286 of power switch 285, and returning to terminal 279 of battery 277, thereby allowing high current pulses to drive right motor 120 in synchronism with the motor drive frequency from 227, but with reverse rotation. Also, there is a time-controlled electrical path from terminal 278 of battery 277, to terminal 135 of left motor 124, through the reverse winding to terminal 142 of left motor 124, to terminal 295 of power switch 293, through its low resistance path to terminal 294 of power switch 293, and returning to terminal 279 of battery 277, thereby allowing high current pulses to drive left motor 124 in synchronism with the motor drive frequency from 237, but with reverse rotation. Since both drive motors are rotating equally in the reverse direction, both traction wheels 122 and 126 are driven at the same speed in the reverse direction, and the vehicle proceeds in the reverse direction at a speed corresponding to the motor drive frequencies. Steering displacement is obtained through the series of operational events described for the forward operating mode.

In order to select a still further operating mode, the operator brings the vehicle to a complete stop, and returns direction control lever 100 to the neutral position. This again opens neutral safety switch 211, and assures a general ready status prior to another selection. The operator may now select one of the unique maneuver modes, by moving the direction control lever 100 to the right rotation position. This action is transmitted mechanically through pivot 102 to direction control lever coupling 110 which closes neutral safety-switch 211 by means of mechanical linkage 212, and activates the four-way direction control switch 210 whereby a constant source voltage level appears at terminal 217, while terminals 215, 216, and 214 remain electrically grounded. This constant source voltage level is transmitted by electrical connection to input terminal 246 of OR-gate 245, and also to input terminal 251 of OR-gate 249. The logic operation of OR-gate 245 immediately causes its output terminal 248 to switch to the constant source voltage level, which is transmitted by electrical connection to input terminal 262 of AND-gate 261. The logic operation of OR-gate 249 immediately causes its output terminal 252 to switch to the constant source voltage level, which is transmitted by electrical connection to input terminal 270 of AND-gate 269. The logic operation of AND-gate 261 maintains its output terminal 264 at zero voltage, since its input terminal 263 is still at zero voltage. The logic operation of AND-gate 269 maintains its output terminal 272 at zero voltage, since its input terminal 271 is still at zero voltage. However, there is one further activity which occurs during the selection of this operating mode. In addition to the function of closing neutral safety switch 211, this time mechanical linkage 212 also activates clutch release 112, whereby coupling 114 and third wheel 115 function as a coaster wheel free of the positioning of steering control 111. In order to center wheel 115 for re-engaging clutch release 112 for mechanical control, wheel 115 may be spring biased at the centered location or other means within the skill of the art may be used. Coupling 114 also depresses a differential inhibit switch 230, which opens the electrical ground connection to wiper 235 of slide switch transducer 232 and to wiper 225 of slide switch transducer 222. This action electrically inhibits the selective function of the transducers, and allow only the combination of data lines 234 and of data lines 224 which determines dividing factors "N" of one hundred. Thus, the displacement of steering control 111 does not affect the frequency-changing circuits 220 in this operating mode. No further electrical action occurs, and the operator is now ready to execute the action which will initiate motion. When accelerator pedal 127 is depressed, the mechanical linkage of coupling 140 displaces wiper 205 of slide switch transducer 202 away from its cutoff position so that a pulse train carrier at 207 of gradually increasing frequency is produced. Pulse train carrier at 207 is transmitted by electrical connection to terminal 208 of neutral safety switch 211, and since this switch is now closed, is allowed to proceed to terminal 209, from which it is transmitted by electrical connection to frequency-changing circuits 220, thus appearing at terminal 223 of frequency dividing counter 221, and also at terminal 233 of frequency dividing counter 231. Since the dividing factors N are now of fixed value, the frequency of pulse train carrier from 207 is now further divided equally by frequency dividing counter 221 and frequency dividing counter 231, each by the same factor of one hundred. The output signal of frequency dividing counter 221 is in the form of a pulse train motor drive frequency at 227, which is transmitted by electrical connection to input terminal 259 of AND-gate 257, to input terminal 263 of AND-gate 261, and to input terminal 266 of OR-gate 265. The output signal of frequency dividing counter 231 is in the form of a pulse train motor drive frequency at 273, which is transmitted by electrical connection to input terminal 267 of OR-gate 265, to input terminal 271 of AND-gate 269, and to input terminal 275 of AND-gate 273. Recalling that input terminal 262 of AND-gate 261 is already at the constant source voltage level, the logic operation of AND-gate 261 allows the pulse train at motor drive frequency from 227 to appear at output terminal 264, and is then transmitted by electrical connection to control terminal 288 of power switch 285. Also, recalling that input terminal 270 of AND-gate 269 is already at the constant source voltage level, the logic operation of AND-gate 269 allows the pulse train at motor drive frequency from 237 to appear at output terminal 272, and is then transmitted by electrical connection to control terminal 292 of power switch 289. The logic operation of AND-gate 257 inhibited because input terminal 258 is at zero voltage, and the logic operation of AND-gate 273 is inhibited because input terminal 274 is at zero voltage. Finally, the logic operation of OR-gate 265 allows a pulse train to appear at output terminal 268 as with other modes, which again is used in the battery-charging technique to be discussed later. The application of a pulse train to control terminal 288 of power switch 285 allows the time-controlled low resistance path between terminal 287 and terminal 286. The application of a pulse train to control terminal 292 of power switch 289 allows the time-controlled low resistance path between terminal 291 and terminal 290. Thus, there is a time-controlled electrical path from terminal 278 of battery 277, to terminal 134 of right motor 120, through the reverse winding to terminal 145 of right motor 120, to terminal 287 of power switch 285, through the low resistance path to terminal 286 of power switch 285, and returning to terminal 279 of battery 277, thereby allowing high current pulses to drive right motor 120 in synchronism with the motor drive frequency from 227, but with reverse rotation. In a like manner, there is a time-controlled electrical path from terminal 278 of battery 277, to terminal 135 of left motor 124, through the forward winding to terminal 141 of left motor 124, to terminal 291 of power switch 289, through the low resistance path to terminal 290 of power switch 289, and returning to terminal 279 of battery 277, thereby allowing high current pulses to drive left motor 124 in synchronism with the motor drive frequency from 237, but with forward rotation. Since both drive motors are rotating at the same speed but in opposite directions, the traction wheels 122 and 126 are driven at the same speed but in opposite directions. The combined traction effect causes the vehicle to rotate to the right about a kinetically determined vertical axis (such axis being located in the vicinity of driver's seat 131). With this unique capability incorporated in a passenger vehicle, it allows an operator frequently to avoid backing up under conditions of limited visibility or space. It also allows right angle maneuvers, assists parking capability, and permits an operator to turn around in a narrow driveway.

For the left rotation operating mode the operator brings the vehicle to a complete stop and returns direction control lever 100 to the neutral position. This again opens neutral safety switch 211, and assures a general ready status prior to another selection. The operator now moves direction control lever 100 to the left rotation position. This action is transmitted mechanically through pivot 102 to direction control lever coupling 110 which closes neutral safety switch 211 by means of mechanical linkage 212, and activates the four-way direction control switch 210 so that a constant source voltage level appears at terminal 214, while terminals 215, 216 and 217 remain electrically grounded. Mechanical linkage 212 also activates clutch release 112, so as to allow coupling 114 and third wheel 115 to function freely from the positioning of steering control 111. Coupling 114 also depresses differential inhibit switch 230, which opens the electrical ground connection to wiper 235 of slide switch transducer 232 and to wiper 225 of slide switch transducer 222. The constant source voltage level at terminal 214 is transmitted by electrical connection to input terminal 243 of OR-gate 241, and also to input terminal 254 of OR-gate 253. The logic operation of OR-gate 241 immediately causes its output terminal 244 to switch to the constant source voltage level, which is transmitted by electrical connection to input terminal 258 of AND-gate 257. The logic operation of OR-gate 253 immediately causes its output terminal 256 to switch to the constant source voltage level, which is transmitted by electrical connection to input terminal 274 of AND-gate 273. The logic operation of AND-gate 257 maintains its output terminal 260 at zero voltage, its input terminal 259 being still at zero voltage. The logic operation of AND-gate 273 maintains its output terminal 276 at zero voltage, its input terminal 275 being still at zero voltage. Thus, no further electrical action occurs, and the operator is now ready to execute the action which will initiate motion. When accelerator pedal 127 is depressed, the mechanical linkage of coupling 140 displaces wiper 205 of slide switch transducer 202 away from its cutoff position so that a pulse train carrier at 207 of gradually increasing frequency is produced. Pulse train carrier at 207 is transmitted by electrical connection to terminal 208 of neutral safety switch 211, and since this switch is now closed, the signal proceeds to terminal 209, from whence it is transmitted by electrical connection to frequency-changing circuits 220, thus appearing at terminal 223 of frequency dividing counter 221, and also at terminal 233 of frequency dividing counter 231. Since the dividing factors N are now of fixed value, the frequency of pulse train carrier from 207 is now further divided equally by frequency dividing counter 221 and frequency dividing counter 231, each by the same factor of one hundred. The output signal of frequency dividing counter 221 is in the form of a pulse train motor drive frequency at 227, which is transmitted by electrical connection to input terminal 259 of AND-gate 257, to input terminal 263 of AND-gate 261, and to input terminal 266 of OR-gate 265. The output signal of frequency dividing counter 231 is in the form of a pulse train motor drive frequency 237, which is transmitted by electrical connection to input terminal 267 of OR-gate 265, to input terminal 271 of AND-gate 269, and to input terminal 275 of AND-gate 273. Recalling that input terminal 258 of AND-gate 257 is already at the constant source voltage level, the logic operation of AND-gate 257 allows the pulse train at motor drive frequency from 227 to appear at output terminal 260, and the signal is then transmitted by electrical connection to control terminal 284 of power switch 281. Also, recalling that input terminal 274 of AND-gate 273 is already at the constant source voltage level, the logic operation of AND-gate 273 allows the pulse train at motor drive frequency from 237 to appear at output terminal 276, which is then transmitted by electrical connection to control terminal 296 of power switch 293. The logic operation of AND-gate 261 is inhibited because input terminal 262 is at zero voltage, and the logic operation of AND-gate 269 is inhibited because input terminal 270 is at zero voltage. Finally, the logic operation of OR-gate 265 allows the pulse train signal to appear at output terminal 268 as with other modes, which again is used in the battery-charging technique to be discussed later. Application of a pulse train signal to control terminal 284 of power switch 281 creates a time-controlled low resistance path between terminal 283 and terminal 282. Application of a pulse train signal to control terminal 296 of power switch 293 creates a time-controlled low resistance path between terminal 295 and terminal 294. Thus, there is a time-controlled electrical path from terminal 278 of battery 277, to terminal 134 of right motor 120, through the forward winding to terminal 144 of right motor 120, to terminal 283 of power switch 281, through the low resistance path to terminal 282 of power switch 281, and returning to terminal 279 of battery 277, thereby allowing high current pulses to drive right motor 120 in synchronism with the motor drive frequency from 227, but with forward rotation. In like manner, there is a time-controlled electrical path from terminal 278 of battery 277, to terminal 135 of left motor 124, through the reverse winding to terminal 142 of left motor 124, to terminal 295 of power switch 293, through the low resistance path to terminal 294 of power switch 293, and returning to terminal 279 of battery 277, thereby allowing high current pulses to drive left motor 124 in synchronism with the motor drive frequency from 237, but with reverse rotation. Since both drive motors are rotating at the same speed but in opposite directions, traction wheels 122 and 126 are driven at the same speed but in opposite directions. The combined traction effect causes the vehicle to rotate to the left about a kinetically determined vertical axis (such axis located in the vicinity of driver's seat 131).

In each description of the four operating modes with reference to FIG. 2, it was stated that a pulse train signal appeared at output terminal 268 of OR-gate 265. Referring now to FIGS. 4, 5, and 6, it is seen that diagram (a) of FIG. 5 shows the timing of the waveform of the pulse train which appears at output terminal 268 of OR-gate 265. FIGS. 4 and 6 duplicate only that portion of FIG. 2 necessary to provide continuity of connections in the following discussion. It is also to be noted that the sections of FIGS. 4 and 6 show an electrical energy source 402 driven by some means of energy converter such as an internal combustion engine, turbine, etc. The battery-charging operation is the same in both FIGS. 4 and 6. However, in the hybrid approach of FIG. 4, a clean-air prime mover 400 which can be run at constant speed is suggested; whereas in the simplified approach of FIG. 6, use may be made of any available energy which can be converted to furnish an electrical supply ample to recharge the battery to a greater or lesser degree, whether it be gravitational, inertial, or other means.

Assuming, then, that an electrical energy source 402 of ample capability is available, the battery-charging operation as seen in either FIGS. 4 or 6 is as follows. The controlling signal is the pulse train appearing at output terminal 268 of OR-gate 265, which is transmitted by electrical connection shown issuing from the confines of time sharing control 240, and terminating at input terminal 407 of an inverter amplifier 406. A timing diagram (a) of this pulse train is seen in FIG. 5. The time duration when the signal is at the upper (or source) voltage level, is the pulse width of the waveform, and corresponds to a time period when one or both electric drive motors are being pulsed by currents drawn from the battery 277 following the time-controlled electrical paths described previously. The remainder of the waveform, up to the start of the next pulse, is the time duration when the signal is at the lower (or zero) voltage level, and corresponds to time periods when neither electric drive motor is drawing current from the battery 277. The logic operation of inverter amplifier 406 produces a signal at output terminal 410 which is (assuming negligible delay time) an inversion of the waveform in diagram (a) of FIG. 5. Such an inverted waveform is seen in diagram (b) in FIG. 5. For this waveform, the signal is at the upper (or source) voltage level for the longer time duration of the duty cycle, and is thus at the lower (or zero) voltage level for the shorter time duration of the duty cycle. This inverted signal is transmitted by electrical connection to control terminal 415 of power switch 411. Thus, the waveform applied to control terminal 415 of power switch 411 is such that it provides a low resistance path between terminal 414 of power switch 411 to terminal 412 of power switch 411 for a time duration corresponding to time periods when neither electric drive motor is drawing current from the battery 277. Therefore, there is a time-controlled electrical path from terminal 405 of electrical energy source 402, to terminal 278 of battery 277, through the recharging battery to terminal 279 of battery 277, to terminal 414 of power switch 411, through the low resistance path to terminal 412 of power switch 411, and returning to terminal 404 of electrical energy source 402, thereby allowing recharging of the battery during any time period when it is not required that large currents be drawn from the battery. The type electrical circuit and placement of power switch 411 are largely matters of design skill. However, the symbolism indicated for this component suggests that a time-controlled bilateral device known commercially as a "Triac" might be used where time-controlled current flow in both directions is desired.

It will be appreciated that both mechanical and electrical components and elements and groups of same which are generally widely known in the field to which the invention pertains have not, in many cases, been described in detail inasmuch as their exact nature or type is not necessary for an understanding and use of the invention by a person skilled in the art.

Having thus described my invention, what I claim as new and desire to secure by Letters Patent of the United States is:

1. An electrically powered transportation means which comprises frame means, a pair of propelling rotatable means on each side of said frame means, a pair of synchronous motors mounted on said frame means, one of each of said motors being connected to each of said rotatable means for turning said rotatable means at a rotational speed having a controlled predetermined relationship to the corresponding connected motor's rotational speed, each said motor including a torque producing drive field and a rotor field, a pair of electrical drive field producing means each determining the current frequency which separately synchronously determines substantially exactly the rotational speed of its corresponding said motors, electrical power producing means for the rotor field of each of said motors, and speed controlling means which performs the functions of separately and directly fixing the frequency of each said drive field producing means whereby said transportation means is propelled at a predetermined speed and steered in response to the separately governed rotational speeds of each of said motors.

2. An electrically powered transportation means in accordance with claim 1, wherein said controlling means comprises an accelerator pedal and a steering wheel.

3. An electrically powered transportation means in accordance with claim 1, wherein said controlling means comprises externally applied signals.

4. An electrically powered transportation means in accordance with claim 3, wherein said signals comprise electromagnetic signals.

5. An electrically powered vehicle which comprises frame means, a pair of propelling rotatable means on each side of said frame means, a pair of synchronous motors mounted on said frame means, one of said motors being connected to each of said rotatable means for turning said rotatable means at a rotational speed having a controlled predetermined relationship to the corresponding connected motor's rotational speed, each said motor including a torque producing drive field and a rotor field, a pair of electrical drive field producing means each separately synchronously governing the rotational speed of each of said motors, electrical power producing means for the rotor field of each of said motors, and controlling means controlling each said drive field producing means whereby said transportation means is propelled and steered in response to the separately governed rotational speeds of each of said motors, each said drive field producing means including at least one switching means, said switching means opening and closing electrical current to said drive field producing means in response to a signal generated by a signal producing means included in said controlling means.

6. An electrically powered transportation means in accordance with claim 5 wherein said switching means comprises a power switch.

7. An electrically powered transportation means in accordance with claim 5 wherein said controlling means includes a variable frequency generator, accelerator means connected to said variable frequency generator, and a frequency changing circuit, each said signal producing means included as a part of said frequency changing circuit.

8. An electrically powered transportation means in accordance with claim 7 wherein said variable frequency generator comprises a variable frequency pulse generator.

9. An electrically powered transportation means in accordance with claim 7 wherein each said signal producing means includes a frequency changing means, said frequency changing means each receiving signals from said variable frequency generator, frequency changing switch means cooperating with said frequency changing means whereby the frequency output of each of said frequency changing means may be independently varied.

10. An electrically powered transportation means in accordance with claim 9 wherein each said frequency changing means is a programmable frequency dividing counter.

11. An electrically powered transportation means in accordance with claim 5 wherein further switching means is provided for each of said drive field producing means, said further switching means adapted selectively to reverse the rotation of its respective motor in response to said controlling means.

12. An electrically powered transportation means which comprises frame means, a pair of propelling rotatable means on each side of said frame means, a pair of synchronous motors mounted on said frame means, one of each said motors being connected to each of said rotatable means for turning said rotatable means at a rotational speed having a controlled predetermined relationship to the corresponding connected motor's rotational speed, each said motor including a torque producing drive field and a rotor field, a pair of electrical drive field producing means each separately synchronously governing the rotational speed of each of said motors, electrical power producing means for the rotor field of each of said motors, and controlling means controlling each said drive field producing means whereby said transportation means is propelled and steered in response to the separately governed rotational speeds of each of said motors, the transportation means further including electrical power means wherein said electrical power producing means comprises an electrical energy source and a battery, a circuit between said batteryy and each of said motors including pulse producing means providing said drive fields of said motors, and means for charging said battery by said energy source whereby said battery is charged between said pulses.

13. A control system for a pair of synchronous motors, said system comprising a single control for changing the motor drive frequency of said pair of motors and a further single control for creating a motor drive differential thereby performing the function of causing a selected rotational speed differential between said motors with the rotational speed of one said motor being increased and the rotational speed of the other said motor being decreased by substantially equal amounts.

14. An electrically powered transportation means which comprises a frame means, a pair of propelling rotatable means located on each side of said frame means, a pair of synchronous motors mounted on said frame means, one of each of said motors being connected to each of said rotatable means for turning its corresponding said rotatable means at a rotational speed having a controlled predetermined relationship to the rotational speed of its corresponding said motor, each said motor including a torque producing drive means and rotor field, a pair of electrical drive field producing means each determining the current frequency which separately synchronously determines substantially exactly the rotational speed of its corresponding said motors, electrical power producing means for the rotor field of each of said motors, and controlling means for controlling the direction of rotation of each of said rotatable means whereby said transportation means can be turned with one rotatable means rotated at a fixed rotational speed in one direction and the other rotatable means rotated at the same fixed rotational speed in the other direction, about a predetermined stationary vertical axis.

* * * * *